Jan. 3, 1928.
J. L. RICE
1,655,241
BLEEDER VALVE FOR AIR BRAKE SYSTEMS
Filed June 30, 1927
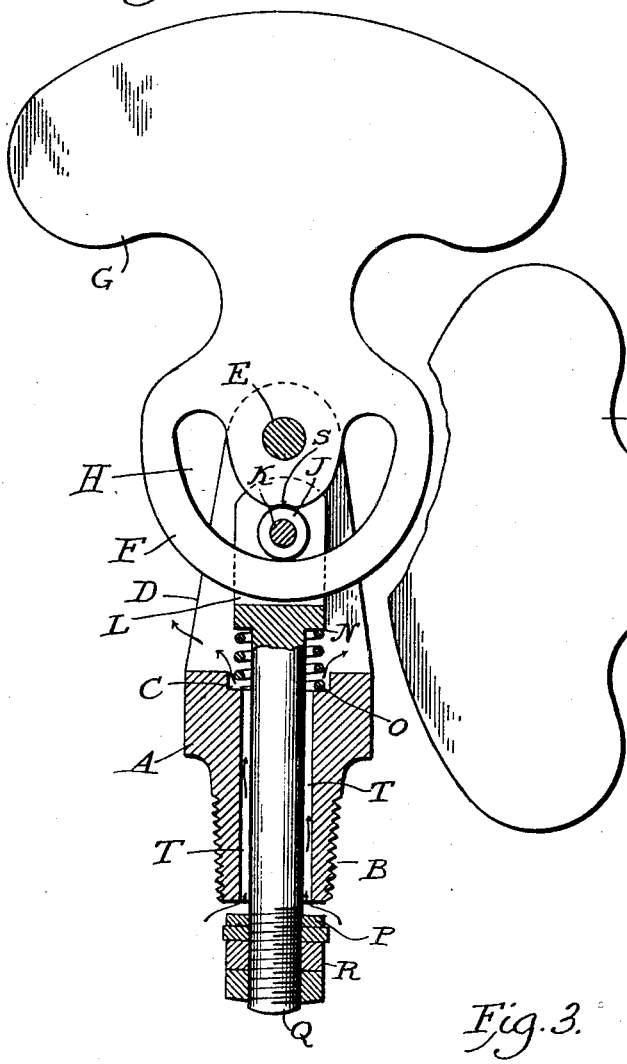
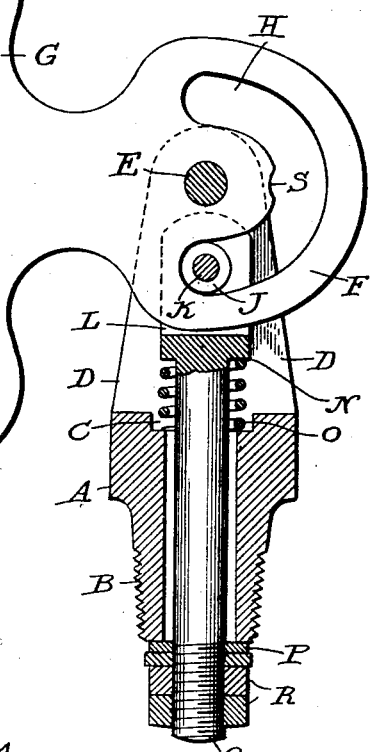
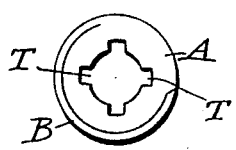
Inventor
James L. Rice
By
Attorney Patented Jan. 3, 1928.

1,655,241

UNITED STATES PATENT OFFICE.

JAMES L. RICE, OF NASHVILLE, TENNESSEE, ASSIGNOR OF FIVE PER CENT TO ROBERT E. GARRETT, OF NASHVILLE, TENNESSEE.

BLEEDER VALVE FOR AIR-BRAKE SYSTEMS.

Application filed June 30, 1927. Serial No. 202,540.

My invention relates to improvements in bleeder valves for air brake systems and the leading object of the invention is the provision of a valve which will dispense with the necessity of an attendant holding the valve relief mechanism open as at present while bleeding or releasing the air from the tanks and lines.

Another object of my invention is the provision of a valve of the character described which will retain the valve closed while the air pressure is on and which can be instantly operated to release the air when desired and which valve will be retained in unstable equilibrium so that any jar caused by movement of the valve or train will cause the valve to close.

Another object of my invention is the provision of a valve which in addition to dispensing with the usual long time attention of an attendant will be capable of application to air brake systems in use or at the time of manufacture.

Another object of my invention is the provision of a bleeder valve which will normally retain the valve in closed position to maintain the proper air pressure in the tanks and lines, and which can instantly be moved to open position to release the air in an effective manner.

Another object of my invention is the provision of a valve which will be composed of few parts to produce a strong, durable and inexpensive structure capable of withstanding hard usage and which will prove thoroughly efficient and practical in every particular.

To attain the desired objects, my invention consists of a bleeder valve of the character and for the purpose stated embodying novel features of construction and combination of parts, substantially as described and claimed and as shown in the accompanying drawing, wherein:

Figure 1 represents a view partly in elevation and partly in central vertical section of a bleeder valve for air brake systems constructed in accordance with and embodying my invention, the parts being in the position they occupy when the air is being released, or in open position, and Figure 2 represents a simliar view with the parts in the position they occupy when the valve is normal or closed.

Figure 3 represents a detail view.

In carrying my invention into effect I propose to make the structure extremely simple, durable and inexpensive in order that the valve may commend itself and in accordance with my invention I employ the tubular body A, which is provided with the lower threaded portion B, for connection with the tank or other part of the system and which body portion is further provided with an annular shoulder C, and the pair of spaced uprights D, and mounted in the upper portion of said upright is the shaft E, upon which is mounted the cam head F, which is formed with an outer integral weighted portion G.

The cam head is thus pivoted upon said shaft and is formed to move or play between the uprights of said body A, and said cam head is provided with a curved slot H, which travels upon the roller J, mounted upon the shaft K, carried by the bifurcated upper portion L, of the valve stem M, which is formed with a flanged upper portion N, against which and the shoulder C bears the upper and lower ends of the coiled spring O, which normally retains the washer P, retained upon the threaded end Q, of the valve stem by means of the pair of securing nuts R.

From this construction the operation of the invention will be readily understood and as shown in Figure 2, the parts of the valve are retained in closed position and in Figure 1 the weight is raised to vertical position to bring the recess S in the curved slot into engagement with the roller J and this maintains the valve in open position and permits the air to escape as shown by the arrows in said Figure 1. In other words, when the parts are in the position shown in Figure 2, the valve is closed and the air is retained under pressure and to release the air and remove the pressure the weighted cam head is moved to the position shown in Figure 1 and the valve stem is moved downward to release the valve and permit the escape of air.

It will be apparent to all persons skilled in an invention of this character that I provide a bleeder valve which can be easily adapted to air brakes in use or when first manufactured and at a very small cost that such valves will prove a great saving in time and expense by dispensing with the attention of an attendant, and that generally the valve will commend itself as practical and very useful.

It will be noted that the most important feature of my invention resides in the construction which allows the operator to open the valve to release the pressure and that further attention on his part is not necessary, as the jar or impact of the train in starting causes the weight to fall and close the valve.

It will thus be seen that the valve when closed will be retained in such position to confine the air in the system and that the attendant can instantly raise the pivoted member to vertical position to open the valve and release the air, and that the valve when the parts are in open condition places the said pivoted member in unstable equilibrium so that any jar or movement of the valve will cause the member to fall from vertical to horizontal position and close the valve.

I claim:

1. A bleeder valve for air brake systems, consisting of a tubular body, a valve mounted in said body, and a weighted portion having a head for controlling the closing of said valve, upon a jarring movement of the valve.

2. A bleeder valve for air brake systems, consisting of a tubular body, a valve stem mounted in said body, a valve carried by said stem, a weight having pivotal connection with said body, and a head on said weight engaging the stem to retain the valve in open and closed position, said weighted portion acting to retain the valve closed when in horizontal position and holding the valve open when in vertical position, the vertical position of said member being sustained in unstable equilibrium in order that jarring thereof will cause the member to drop to vertical position and close the valve.

3. A bleeder valve for air brake systems, consisting of a tubular body, a valve stem mounted in said body, a valve carried by said stem, a roller mounted in said stem, and a weighted portion pivotally mounted in the body and having a slot to receive said roller, the pivotal movement of said slot causing the opening and closing of said valve, said weighted portion acting to retain the valve closed when in horizontal position and holding the valve open when in vertical position, the vertical position of said member being sustained in unstable equilibrium in order that jarring thereof will cause the member to drop to vertical position and close the valve.

4. A bleeder valve for air brake systems, consisting of a tubular body, a valve stem mounted in said body, a valve carried by said stem, a weighted portion having a slotted head engaging said valve stem to hold the valve in open and closed positions, said slot being formed with an abutting portion to retain the weight in vertical position, said weighted portion acting to retain the valve closed when in horizontal position and holding the valve open when in vertical position, the vertical position of said member being sustained in unstable equilibrium in order that jarring thereof will cause the member to drop to vertical position and close the valve.

5. A bleeder valve for air brake systems, consisting of a tubular body, a valve stem mounted in said body, a valve carried by said stem, a spring arranged between the body and stem to retain the valve in normally closed position, a weighted portion having a slotted head engaging the valve stem to raise and lower said stem, and means to retain the weighted portion in position to hold the valve open, said weighted portion acting to retain the valve closed when in horizontal position and holding the valve open when in vertical position, the vertical position of said member being sustained in unstable equilibrium in order that jarring thereof will cause the member to drop to vertical position and close the valve.

6. A valve of the character described, consisting of a valve body, a valve mounted to reciprocate in said body, a member pivoted in said body in unstable equilibrium, one end of said member being connected to said valve and the other end being free and adapted when jarred to drop from vertical to horizontal position to close said valve.

In testimony whereof I hereunto affix my signature.

JAMES L. RICE.